US009020666B2

(12) United States Patent
Ohtomo et al.

(10) Patent No.: US 9,020,666 B2
(45) Date of Patent: Apr. 28, 2015

(54) TAKING-OFF AND LANDING TARGET INSTRUMENT AND AUTOMATIC TAKING-OFF AND LANDING SYSTEM

(75) Inventors: Fumio Ohtomo, Tokyo-to (JP); Kazuki Osaragi, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 13/453,242

(22) Filed: Apr. 23, 2012

(65) Prior Publication Data

US 2012/0277934 A1    Nov. 1, 2012

(30) Foreign Application Priority Data

Apr. 28, 2011    (JP) ................................. 2011-101913

(51) Int. Cl.
*G06F 19/00* (2011.01)
*G05D 1/10* (2006.01)
*G05D 1/06* (2006.01)

(52) U.S. Cl.
CPC ............ *G05D 1/0669* (2013.01); *G05D 1/0676* (2013.01)

(58) Field of Classification Search
CPC ....... G08G 5/025; G08G 5/02; G08G 5/0069; G05D 1/0676; G05D 1/0858; G05D 1/00; G05D 1/0202; G05D 1/0653; G05D 1/102; B64D 45/04; B64D 45/0005; B64C 2201/123; B64C 2201/127; G01S 19/15; G01S 13/913; B64F 1/18; B64F 1/007; G06T 2207/10016; G06T 2207/30244; G01M 11/31
See application file for complete search history.

(56) References Cited

U.S. PATENT DOCUMENTS

| 4,005,818 | A |   | 2/1977  | Krause et al. |
|-----------|---|---|---------|---------------|
| 4,177,579 | A | * | 12/1979 | Peters et al. .................... 434/43 |
| 4,210,930 | A | * | 7/1980  | Henry ........................... 348/117 |
| 4,359,733 | A |   | 11/1982 | O'Neill |

(Continued)

FOREIGN PATENT DOCUMENTS

| EP | 1139062 A2 | 10/2001 |
|----|------------|---------|
| EP | 1158309 A2 | 11/2001 |

(Continued)

OTHER PUBLICATIONS

European Communication, transmitting Extended European Search Report, dated May 16, 2012 in co-pending European Patent Application No. EP 11195300.6.

(Continued)

*Primary Examiner* — Jerrah Edwards
*Assistant Examiner* — Demetra Smith-Stewart
(74) *Attorney, Agent, or Firm* — Nields, Lemack & Frame, LLC

(57) ABSTRACT

The taking-off and landing target instrument 2 to be used in an automatic taking-off and landing system, comprising a target 37 having as many light emitting elements 44 as required for displaying patterns and a target control unit 38 for controlling light emission of the light emitting elements, wherein the light emitting elements are provided on a taking-off and landing surface of the target and are arranged so that a target mark 43 having the center of pattern under all turned-on status is formed, and wherein the target control unit controls a light emission so as to display firstly all turned-on patterns where all of the light emitting elements are turned on, and next, so as to display the light emitting elements in a predetermined pattern.

9 Claims, 8 Drawing Sheets

(56) References Cited

U.S. PATENT DOCUMENTS

| | | | |
|---|---|---|---|
| 4,404,553 A * | 9/1983 | Cuffia | 345/690 |
| 4,490,028 A | 12/1984 | Kucher | |
| 4,654,872 A | 3/1987 | Hisano et al. | |
| 4,858,157 A | 8/1989 | Murai et al. | |
| 4,862,164 A * | 8/1989 | Croley et al. | 340/952 |
| 5,072,396 A | 12/1991 | Fitzpatrick et al. | |
| 5,166,878 A | 11/1992 | Poelstra | |
| 5,235,513 A * | 8/1993 | Velger et al. | 701/16 |
| 5,262,856 A | 11/1993 | Lippman et al. | |
| 5,274,453 A | 12/1993 | Maeda | |
| 5,490,075 A | 2/1996 | Howard et al. | |
| 5,530,420 A | 6/1996 | Tsuchiya et al. | |
| 5,559,510 A * | 9/1996 | Strong et al. | 340/954 |
| 5,684,887 A | 11/1997 | Lee et al. | |
| 5,986,581 A * | 11/1999 | Magdaleno et al. | 340/953 |
| 6,006,158 A * | 12/1999 | Pilley et al. | 701/120 |
| 6,031,568 A | 2/2000 | Wakitani | |
| 6,084,510 A | 7/2000 | Lemelson et al. | |
| 6,193,190 B1 * | 2/2001 | Nance | 244/114 R |
| 6,385,334 B1 | 5/2002 | Saneyoshi et al. | |
| 6,405,975 B1 * | 6/2002 | Sankrithi et al. | 244/1 R |
| 6,442,293 B1 | 8/2002 | Ito et al. | |
| 6,509,844 B1 * | 1/2003 | Eyring | 340/954 |
| 6,608,559 B1 | 8/2003 | Lemelson et al. | |
| 6,626,078 B2 | 9/2003 | Thornton | |
| 6,690,451 B1 | 2/2004 | Schubert | |
| 6,694,064 B1 | 2/2004 | Benkelman | |
| 6,731,331 B1 | 5/2004 | Watabe et al. | |
| 6,995,792 B1 | 2/2006 | Ogura | |
| 7,010,401 B1 | 3/2006 | Richburg et al. | |
| 7,050,909 B2 | 5/2006 | Nichols et al. | |
| 7,242,817 B2 | 7/2007 | Takeda et al. | |
| 7,391,340 B2 * | 6/2008 | Malhomme | 340/947 |
| 7,418,320 B1 | 8/2008 | Bodin et al. | |
| 7,552,025 B2 | 6/2009 | Ohtomo et al. | |
| 7,590,484 B2 * | 9/2009 | Gellert | 701/120 |
| 7,666,682 B2 * | 2/2010 | Armentrout et al. | 436/56 |
| 7,671,998 B2 | 3/2010 | Ohtomo et al. | |
| 7,725,257 B2 | 5/2010 | Strelow et al. | |
| 7,726,033 B2 | 6/2010 | Ohtomo et al. | |
| 7,755,513 B2 * | 7/2010 | Wang et al. | 340/955 |
| 7,804,996 B2 | 9/2010 | Ohtomo et al. | |
| 8,019,490 B2 | 9/2011 | Ferren et al. | |
| 8,078,349 B1 * | 12/2011 | Prada Gomez et al. | 701/23 |
| 8,218,131 B2 | 7/2012 | Otani et al. | |
| 8,301,326 B2 * | 10/2012 | Malecki et al. | 701/24 |
| 8,422,777 B2 * | 4/2013 | Aller | 382/165 |
| 8,422,825 B1 | 4/2013 | Neophytou et al. | |
| 8,589,071 B2 * | 11/2013 | Feyereisen et al. | 701/457 |
| 8,630,755 B2 | 1/2014 | Ohtomo et al. | |
| 8,666,571 B2 | 3/2014 | Ohtomo et al. | |
| 2002/0001406 A1 | 1/2002 | Kochi et al. | |
| 2002/0085094 A1 | 7/2002 | Teuchert | |
| 2002/0089588 A1 | 7/2002 | LeCompte | |
| 2002/0163582 A1 | 11/2002 | Gruber et al. | |
| 2002/0180636 A1 | 12/2002 | Lin et al. | |
| 2002/0180870 A1 | 12/2002 | Chen | |
| 2002/0191837 A1 | 12/2002 | Takeda et al. | |
| 2004/0041999 A1 | 3/2004 | Hogan et al. | |
| 2004/0073578 A1 | 4/2004 | Nam et al. | |
| 2004/0076340 A1 | 4/2004 | Nielsen | |
| 2004/0105493 A1 | 6/2004 | Kondo et al. | |
| 2004/0105579 A1 | 6/2004 | Ishii et al. | |
| 2004/0125984 A1 | 7/2004 | Ito et al. | |
| 2004/0234122 A1 | 11/2004 | Kochi et al. | |
| 2004/0264763 A1 | 12/2004 | Mas et al. | |
| 2005/0084975 A1 * | 4/2005 | Armentrout et al. | 436/56 |
| 2005/0125142 A1 * | 6/2005 | Yamane | 701/200 |
| 2005/0165517 A1 | 7/2005 | Reich | |
| 2005/0286760 A1 | 12/2005 | Ohtomo et al. | |
| 2006/0138277 A1 | 6/2006 | Franceschini et al. | |
| 2006/0239539 A1 | 10/2006 | Kochi et al. | |
| 2007/0025595 A1 | 2/2007 | Koizumi et al. | |
| 2007/0081695 A1 | 4/2007 | Foxlin et al. | |
| 2007/0093945 A1 | 4/2007 | Grzywna et al. | |
| 2007/0127101 A1 | 6/2007 | Oldroyd | |
| 2008/0059065 A1 | 3/2008 | Strelow et al. | |
| 2008/0063299 A1 | 3/2008 | Murai et al. | |
| 2008/0071431 A1 * | 3/2008 | Dockter et al. | 701/3 |
| 2008/0075325 A1 | 3/2008 | Otani et al. | |
| 2008/0111815 A1 | 5/2008 | Graves et al. | |
| 2008/0298638 A1 | 12/2008 | Miyazaki | |
| 2009/0015685 A1 | 1/2009 | Shulman | |
| 2009/0087029 A1 | 4/2009 | Coleman et al. | |
| 2009/0122133 A1 | 5/2009 | Hartman | |
| 2009/0306840 A1 * | 12/2009 | Blenkhorn et al. | 701/16 |
| 2010/0013927 A1 | 1/2010 | Nixon | |
| 2010/0033371 A1 | 2/2010 | Kumagai et al. | |
| 2010/0070111 A1 | 3/2010 | Akcasu | |
| 2010/0277587 A1 | 11/2010 | Pechatnikov et al. | |
| 2010/0295855 A1 | 11/2010 | Sasakawa et al. | |
| 2011/0049290 A1 | 3/2011 | Seydoux et al. | |
| 2011/0090337 A1 | 4/2011 | Klomp et al. | |
| 2011/0196598 A1 * | 8/2011 | Feyereisen et al. | 701/120 |
| 2011/0307126 A1 * | 12/2011 | Hogstrom | 701/16 |
| 2012/0007979 A1 * | 1/2012 | Schneider et al. | 348/116 |
| 2012/0007982 A1 | 1/2012 | Giuffrida et al. | |
| 2012/0078451 A1 | 3/2012 | Ohtomo et al. | |
| 2012/0130566 A1 * | 5/2012 | Anderson | 701/16 |
| 2012/0136513 A1 | 5/2012 | Hamburg | |
| 2012/0158222 A1 | 6/2012 | Ehlin et al. | |
| 2012/0173053 A1 | 7/2012 | Ohtomo et al. | |
| 2012/0200703 A1 | 8/2012 | Nadir et al. | |
| 2012/0215388 A1 * | 8/2012 | Pepitone et al. | 701/14 |
| 2012/0249739 A1 | 10/2012 | Gostynski et al. | |
| 2012/0261516 A1 * | 10/2012 | Gilliland et al. | 244/183 |
| 2012/0300070 A1 | 11/2012 | Ohtomo et al. | |
| 2013/0062457 A1 | 3/2013 | Deakin | |
| 2013/0079954 A1 * | 3/2013 | Malecki et al. | 701/2 |
| 2013/0135440 A1 | 5/2013 | Ohtomo et al. | |
| 2013/0142500 A1 | 6/2013 | Yavin | |
| 2014/0055613 A1 | 2/2014 | Ohtomo et al. | |
| 2014/0119716 A1 | 5/2014 | Ohtomo et al. | |

FOREIGN PATENT DOCUMENTS

| | | |
|---|---|---|
| EP | 1378790 A2 | 1/2004 |
| EP | 1659365 A1 | 5/2006 |
| JP | 5-24589 A | 2/1993 |
| JP | 8-159762 A | 6/1996 |
| JP | 8-285588 A | 11/1996 |
| JP | 2662111 B2 | 10/1997 |
| JP | 9-302628 A | 11/1997 |
| JP | 2000-85694 A | 3/2000 |
| JP | 2000-280995 A | 10/2000 |
| JP | 2001-39397 A | 2/2001 |
| JP | 2001-317915 A | 11/2001 |
| JP | 2004-245741 A | 9/2004 |
| JP | 2005-115623 A | 4/2005 |
| JP | 2006-10376 A | 1/2006 |
| JP | 2006-500266 A | 1/2006 |
| JP | 3808833 B2 | 8/2006 |
| JP | 2007-171048 A | 7/2007 |
| JP | 2008-76303 A | 4/2008 |
| JP | 2009-33366 A | 2/2009 |
| JP | 4253239 B2 | 4/2009 |
| JP | 2010-38822 A | 2/2010 |
| JP | 2011-86895 A | 4/2011 |
| JP | 2011-89895 A | 5/2011 |
| JP | 2012-71645 A | 4/2012 |
| JP | 2012-140101 A | 7/2012 |
| JP | 2012-242321 A | 12/2012 |
| JP | 2013-108927 A | 6/2013 |
| KR | 691348 B1 | 3/2007 |
| WO | 02/082181 A1 | 10/2002 |
| WO | 2004/004320 A1 | 1/2004 |
| WO | 2004/027434 A1 | 4/2004 |
| WO | 2004/084136 A2 | 9/2004 |
| WO | 2008/152740 A1 | 12/2008 |

OTHER PUBLICATIONS

Notice of Allowance mailed Sep. 18, 2013 in co-pending U.S. Appl. No. 13/238,419.

(56) References Cited

OTHER PUBLICATIONS

Notice of Allowance mailed Oct. 31, 2013 in co-pending U.S. Appl. No. 13/314,509.
Extended European Search Report issued May 23, 2013 in corresponding European Patent Application No. EP 12165456.
Office Action mailed Jun. 20, 2013 in co-pending U.S. Appl. No. 13/238,419.
Office Action mailed Jul. 30, 2013 in co-pending U.S. Appl. No. 13/314,509.
Office Action mailed Mar. 20, 2014 in co-pending U.S. Appl. No. 14/059,784.
Office Action mailed Aug. 12, 2014 in co-pending U.S. Appl. No. 13/473,659.
Final Rejection mailed Jun. 30, 2014 in co-pending U.S. Appl. No. 14/059,784.
Office Action mailed Jul. 11, 2014 in co-pending U.S. Appl. No. 14/059,784.
Notice of Allowance mailed Nov. 3, 2014 in co-pending U.S. Appl. No. 14/059,784.
Japanese communication issued Oct. 24, 2014 in corresponding Japanese patent application No. 2011-101913.
European communication mailed Nov. 3, 2014 in co-pending European patent application No. EP 12193419.4.
Notice of Allowance mailed Jan. 16, 2015 in co-pending U.S. Appl. No. 13/669,583.
European communication issued Oct. 22, 2014 in co-pending European patent application No. 12168267.8.

\* cited by examiner

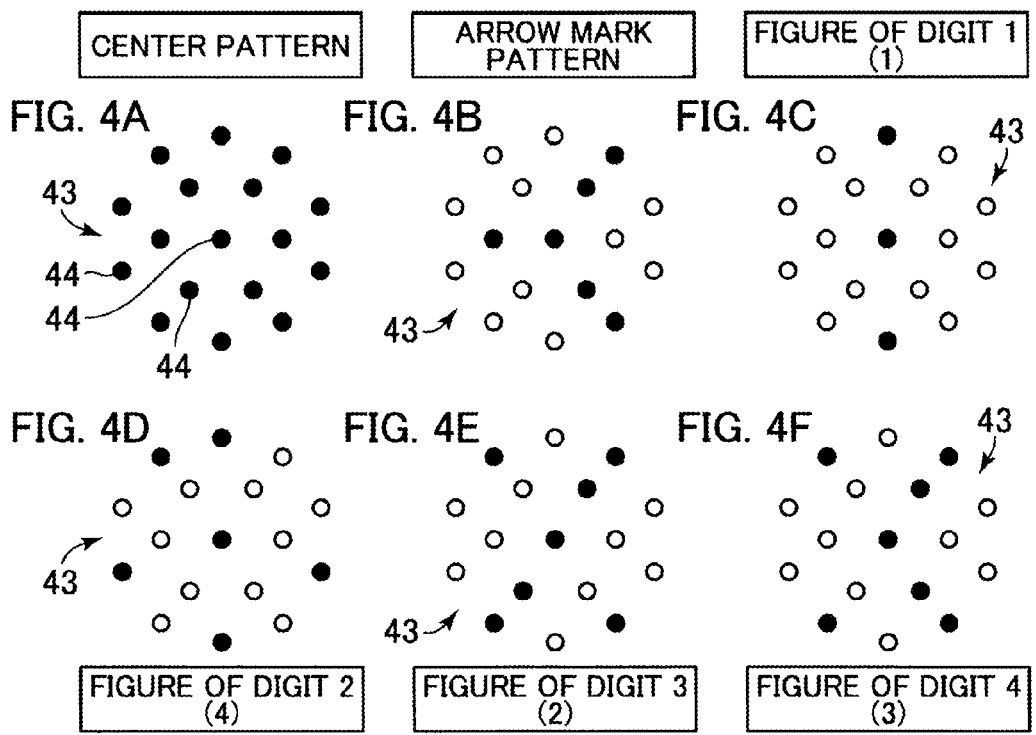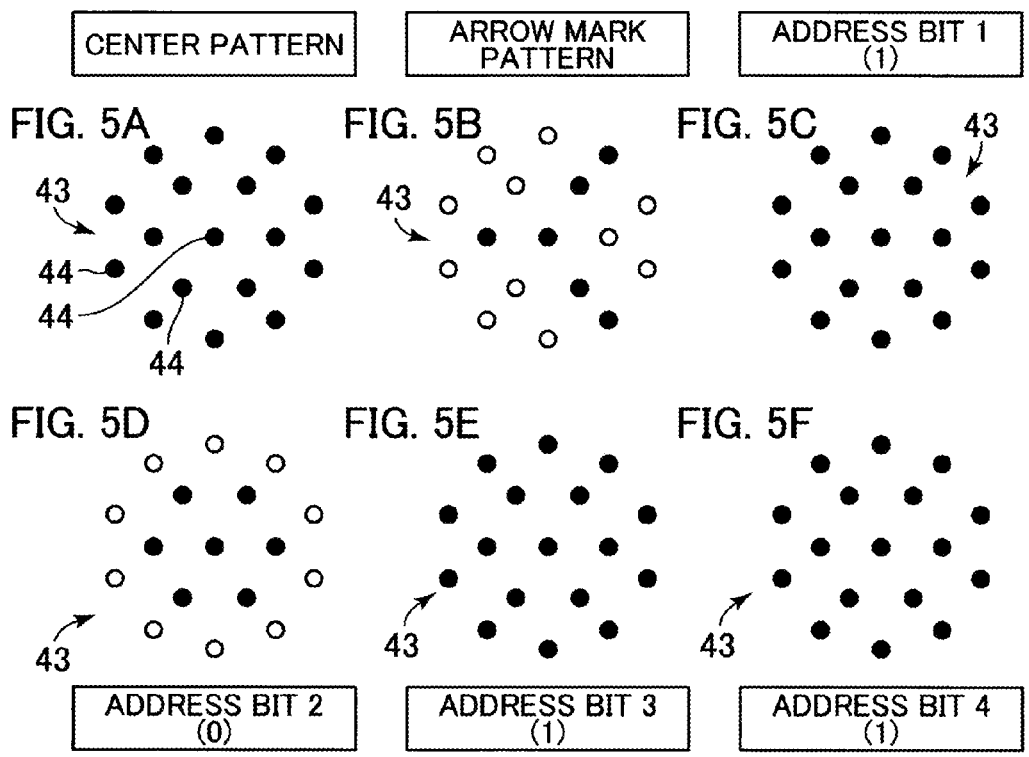

TAKING-OFF AND LANDING TARGET INSTRUMENT AND AUTOMATIC TAKING-OFF AND LANDING SYSTEM

BACKGROUND OF THE INVENTION

The present invention relates to a taking-off and landing target instrument and an automatic taking-off and landing system, according to which a flying object can take off and land automatically.

In photographing or surveying operation from a position high up in the sky, it is possible to acquire such types of information, which cannot be obtained by photographing from ground surface or by surveying operation on the ground surface, or such types of information can be obtained on a place where no person can enter and where it is difficult to perform photographing or surveying operation. In recent years, with the progress of performance characteristics of a flying object such as a small type airplane under remote control or a small type helicopter etc., with the improvement of remote control technique, further, with the improvement of performance characteristics of image pickup device and with technical promotion to miniaturize devices and instruments, etc., it is now possible to provide an image pickup device on a small type flying object and to perform the completely automated photographing from a position high up in the sky by remote control.

For instance, a small type flying object is taken off automatically from a predetermined position (e.g. from a taking-off and landing deck) by remote control or according to a program incorporated in the small type flying object. Then, the small type flying object is flown in a predetermined range to take photographs. After the completion of the photographing, the flying object is operated to return to a preset position where taking-off and landing deck is placed, and further, the flying object is landed automatically on the taking-off and landing deck.

When a small type flying object is operated to take off, to fly and to land automatically, taking-off and landing is difficult to control, in particular, it is difficult to control a small flying object to land at a predetermined position. Therefore, to make the small flying object fly autonomously, it is necessary to establish a technique to perform automatic taking-off and landing in safe and reliable manner by simple control.

In the Japanese Patent Publication JP-A-2000-85694, a landing support system is disclosed, which describes an operation to perform landing of a small type flying object at a predetermined position. In the Japanese Patent Gazette No. 4253239, a navigation system is disclosed, which is used to accomplish landing of a helicopter at a point as desired according to image recognition. The Japanese Patent Gazette No. 2662111, an automatic landing guidance method is disclosed, which describes a procedure for guidance of vertical taking-off and landing operation by using a plurality of image sensors. Also, the Japanese Patent Publication JP-A-9-302628 discloses a movable type taking-off and landing facility for taking-off and landing operation of a small type flying object.

SUMMARY OF THE INVENTION

It is an object of the present invention to provide a taking-off and landing target instrument and an automatic taking-off and landing system, by which it is possible to perform taking-off and landing operation in reliable and safe manner to make the flying object fly autonomously.

To attain the above object, a taking-off and landing target instrument according to the present invention to be used in an automatic taking-off and landing system, comprising a target having as many light emitting elements as required for displaying patterns and a target control unit for controlling light emission of the light emitting elements, wherein the light emitting elements are provided on a taking-off and landing surface of the target and are arranged so that a target mark having the center of pattern under all turned-on status is formed, and wherein the target control unit controls a light emission so as to display firstly all turned-on patterns where all of the light emitting elements are turned on, and next, so as to display the light emitting elements in a predetermined pattern.

Further, in the taking-off and landing target instrument according to the present invention, wherein the predetermined pattern includes a pattern to indicate address of the taking-off and landing target instrument.

Further, in the taking-off and landing target instrument according to the present invention, wherein the predetermined pattern includes a pattern to indicate direction with respect to the taking-off and landing target instrument.

Further, in an automatic taking-off and landing system according to the present invention, comprising a flying object and a taking-off and landing target instrument, wherein the taking-off and landing target instrument comprises a target having as many light emitting elements as required for displaying patterns, and a target control unit for controlling light emission of the light emitting elements, and the light emitting elements are provided on a taking-off and landing surface of the target and are arranged so that a target mark having the center of pattern under all turned-on status is formed, and the target control unit controls a light emission so as to display firstly all turned-on pattern where all of the light emitting elements are turned on, and next, so as to display the light emitting elements in a predetermined pattern, and wherein the flying object comprises an image pickup device for taking an image in downward direction, a navigation means, and a flying object control unit for processing images acquired by the image pickup device and for controlling the navigation means, and the flying object control unit calculates positional relation of the target mark and the flying object based on image of the target mark as acquired by the image pickup device, and controls taking-off and landing operation of the flying object based on the result of calculation.

Further, in the automatic taking-off and landing system according to the present invention, wherein the predetermined pattern includes a pattern to indicate address of the taking-off and landing target instrument, the flying object control unit calculates a position of the center of the target according to all turned-on pattern, calculates horizontal distance between the target and the flying object, calculates altitude of the flying object based on size of all turned-on pattern on the image, and judges whether the taking-off and landing target instrument is an object for landing based on the pattern indicated by the address or not.

Further, in the automatic taking-off and landing system according to the present invention, wherein the predetermined pattern includes a pattern to indicate direction with respect to the target, and the flying object control unit judges moving direction of the flying object according to the pattern to indicate the direction.

Further, in the automatic taking-off and landing system according to the present invention, wherein the flying object has a flight communication unit, the taking-off and landing target instrument has a target communication unit, wherein the target communication unit transmits a synchronization signal for turning on and turning off when the light emitting elements are turned on or turned off, the flying object control unit acquires images of the target at the time of turning on and turning off by the image pickup device based on the synchronization signal received by the flying object communication unit, and extracts a pattern image of each pattern based on image data of the target at the time of turning on and turning off.

Furthermore, in the automatic taking-off and landing system according to the present invention, wherein the taking-off and landing target instruments are installed at two or more points, an inherent address is given to each of the taking-off and landing target instruments, a flight planning data are set up at the flying object control unit, the flying object control unit repeats taking-off and landing operations sequentially to two or more taking-off and landing target instruments based on the flight planning data, and makes the flying object fly autonomously while a power supply unit of the flying object is replaced by the taking-off and landing target instrument.

According to the present invention, the taking-off and landing target instrument to be used in an automatic taking-off and landing system, comprising a target having as many light emitting elements as required for displaying patterns and a target control unit for controlling light emission of the light emitting elements, wherein the light emitting elements are provided on a taking-off and landing surface of the target and are arranged so that a target mark having the center of pattern under all turned-on status is formed, and wherein the target control unit controls a light emission so as to display firstly all turned-on patterns where all of the light emitting elements are turned on, and next, so as to display the light emitting elements in a predetermined pattern. As a result, it is possible to display a target position by the all turned-on pattern display, to sequentially display the predetermined pattern, and also to display information other than the target position by the pattern.

Further, according to the present invention, in the taking-off and landing target instrument, wherein the predetermined pattern includes a pattern to indicate address of the taking-off and landing target instrument. As a result, in a case where there are two or more taking-off and landing target instruments, it is possible to recognize the instrument, and to prevent erroneous recognition and erroneous landing operation.

Further, according to the present invention, in the taking-off and landing target instrument, wherein the predetermined pattern includes a pattern to indicate direction with respect to the taking-off and landing target instrument. As a result, a direction for landing on the target is indicated, and it is possible to provide reliable guidance for landing operation.

According to the present invention, the automatic taking-off and landing system comprising a flying object and a taking-off and landing target instrument, wherein the taking-off and landing target instrument comprises a target having as many light emitting elements as required for displaying patterns, and a target control unit for controlling light emission of the light emitting elements, and the light emitting elements are provided on a taking-off and landing surface of the target and are arranged so that a target mark having the center of pattern under all turned-on status is formed, and the target control unit controls a light emission so as to display firstly all turned-on pattern where all of the light emitting elements are turned on, and next, so as to display the light emitting elements in a predetermined pattern, and wherein the flying object comprises an image pickup device for taking an image in downward direction, a navigation means, and a flying object control unit for processing images acquired by the image pickup device and for controlling the navigation means, and the flying object control unit calculates positional relation of the target mark and the flying object based on image of the target mark as acquired by the image pickup device, and controls taking-off and landing operation of the flying object based on the result of calculation. As a result, the flying object can confirm a target position by the all turned-on pattern display and further, by recognizing a predetermined pattern, it is possible to collect information other than the target position by the pattern.

Further, according to the present invention, in the automatic taking-off and landing system, wherein the predetermined pattern includes a pattern to indicate address of the taking-off and landing target instrument, the flying object control unit calculates a position of the center of the target according to all turned-on pattern, calculates horizontal distance between the target and the flying object, calculates altitude of the flying object based on size of all turned-on pattern on the image, and judges whether the taking-off and landing target instrument is an object for landing based on the pattern indicated by the address or not. As a result, in a case where there are two or more taking-off and landing target instruments, it is possible to recognize the instrument and to prevent erroneous recognition or erroneous landing operation.

Further, according to the present invention, in the automatic taking-off and landing system, wherein the predetermined pattern includes a pattern to indicate direction with respect to the target, and the flying object control unit judges moving direction of the flying object according to the pattern to indicate the direction. As a result, the direction for landing on the target is indicated, and it is possible to ensure reliable landing operation.

Further, according to the present invention, in the automatic taking-off and landing system, wherein the flying object has a flight communication unit, the taking-off and landing target instrument has a target communication unit, wherein the target communication unit transmits a synchronization signal for turning on and turning off when the light emitting elements are turned on or turned off, the flying object control unit acquires images of the target at the time of turning on and turning off by the image pickup device based on the synchronization signal received by the flying object communication unit, and extracts a pattern image of each pattern based on image data of the target at the time of turning on and turning off. As a result, the pattern of the target can be recognized in reliable manner.

Furthermore, according to the present invention, in the automatic taking-off and landing system, wherein the taking-off and landing target instruments are installed at two or more points, an inherent address is given to each of the taking-off and landing target instruments, a flight planning data are set up at the flying object control unit, the flying object control unit repeats taking-off and landing operations sequentially to two or more taking-off and landing target instruments based on the flight planning data, and makes the flying object fly autonomously while a power supply unit of the flying object is replaced by the taking-off and landing target instrument. As a result, it is possible to guarantee autonomous flight in wider range and to ensure photographing and surveying operation in efficient and reliable manner.

BRIEF DESCRIPTION OF THE DRAWINGS

FIG. 4A to FIG. 4F are explanatory drawings to show an example of turned-on pattern of a target mark of a target to be used in the embodiment;

FIG. 5A to FIG. 5F are explanatory drawings to show another example of turned-on pattern of a target mark of a target to be used in the embodiment;

DETAILED DESCRIPTION OF THE PREFERRED EMBODIMENTS

Description will be given below on embodiments of the present invention by referring to the attached drawings.

Figure 2:
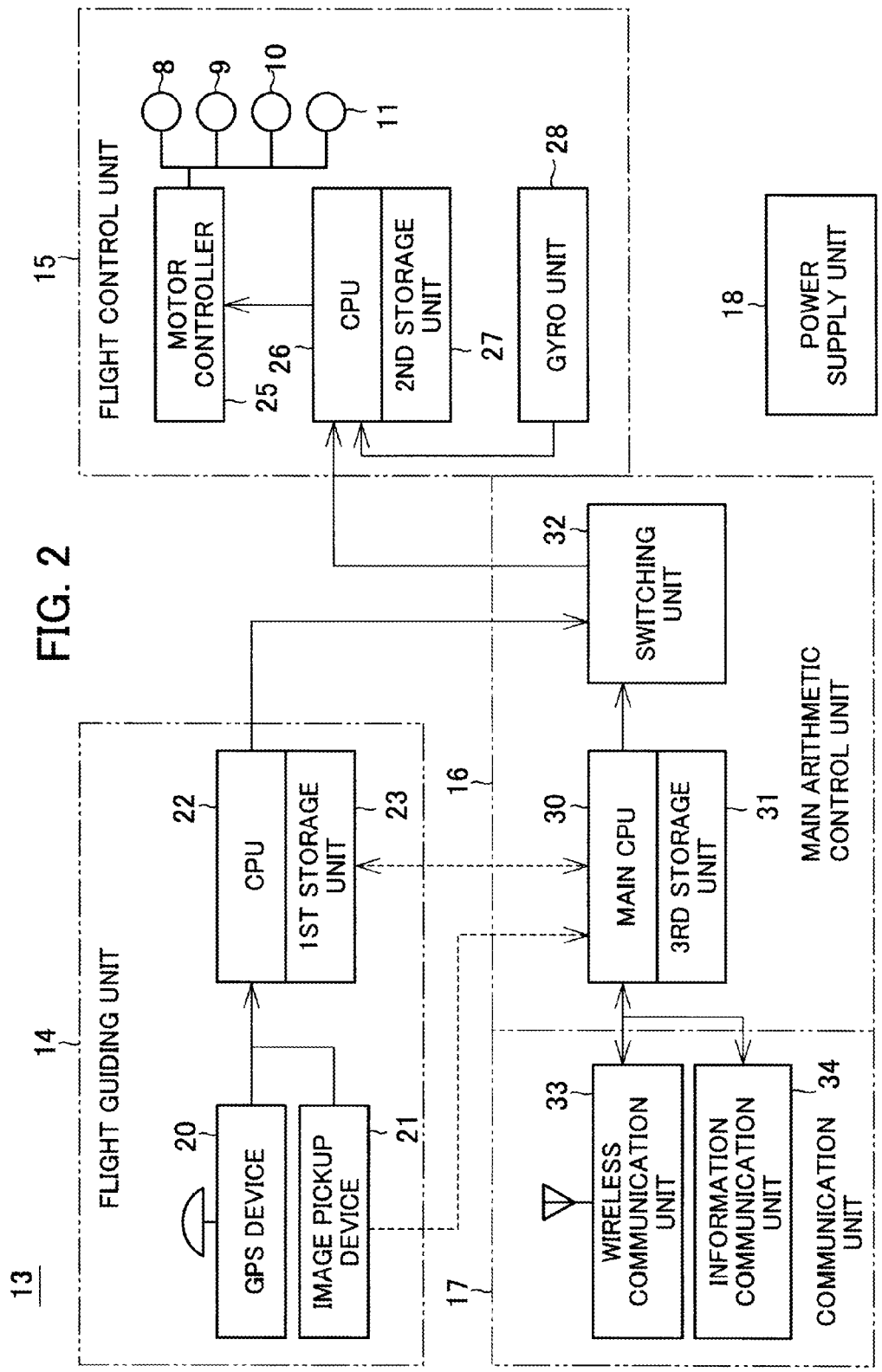
FIG. 2 is a schematical block diagram of the embodiment of the present invention.
Figure 3:
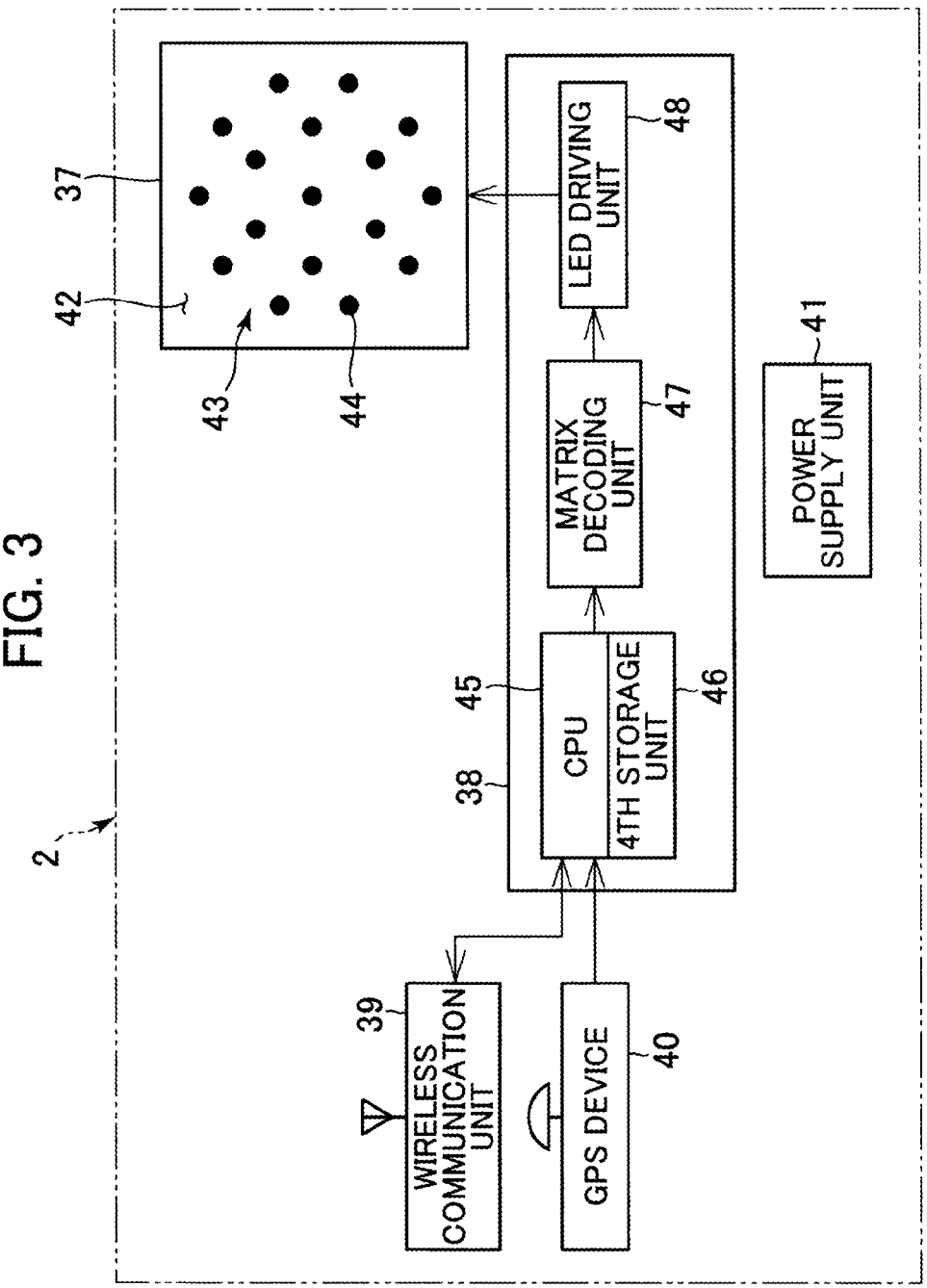
FIG. 3 is a schematical block diagram of a taking-off and landing target instrument to be used in the embodiment.

First, by referring to FIG. 1 to FIG. 3, description will be given on general features of an automatic taking-off and landing system according to the present invention.

Figure 1:
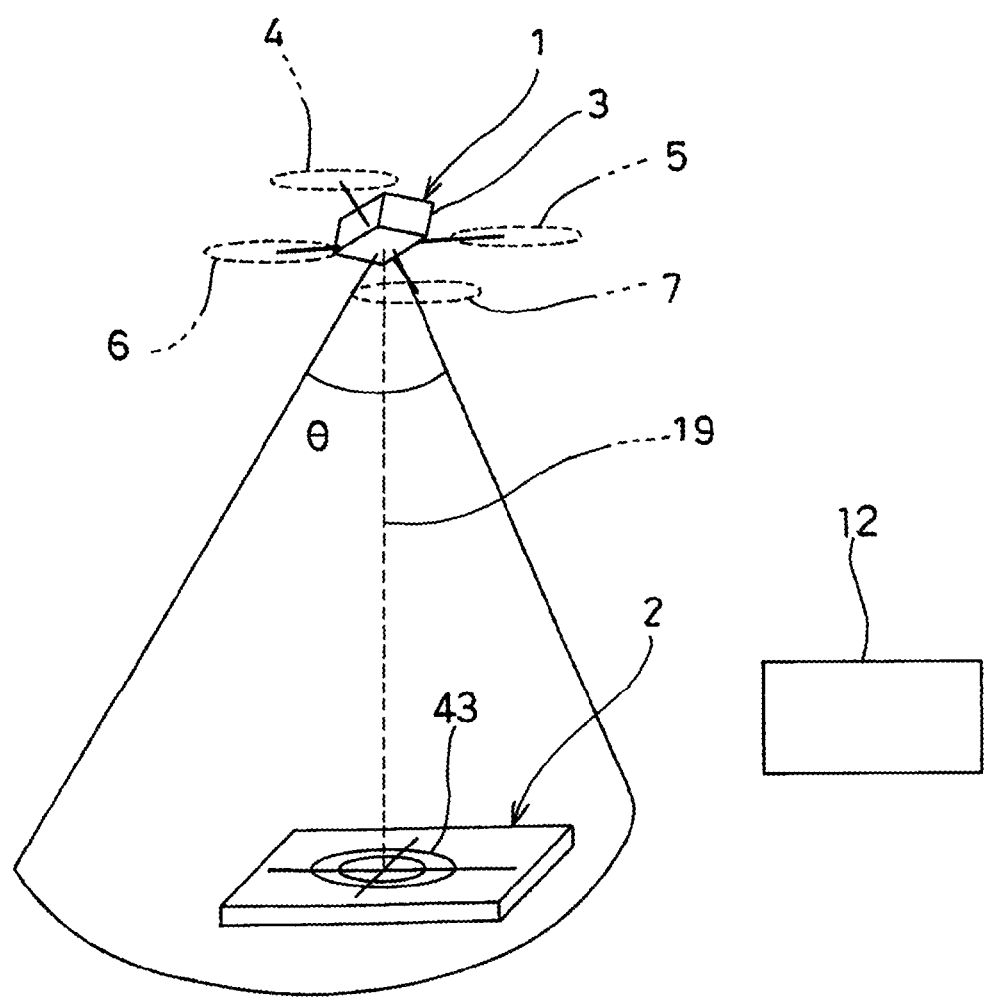
FIG. 1 is an explanatory drawing to show general features of an embodiment of the present invention.

FIG. 1 shows a basic configuration of an automatic taking-off and landing system according to a first embodiment of the present invention. The automatic taking-off and landing system primarily comprises a flying object 1 and a taking-off and landing target instrument 2 provided on a base station side. The flying object 1 is a helicopter, which executes an autonomous (self-controlled) flight as a small type flying object, for instance. Further, the helicopter 1 is designed so that it can be remotely controlled. In FIG. 1, numeral 12 represents a remote controller for remote control.

The taking-off and landing target instrument 2 has a target 37 (to be described later) where a target mark 43 is displayed by light emission of light emitting elements 44 (to be described later) and a target control unit 38 (to be described later), which controls the light emission of the light emitting elements.

The helicopter 1 primarily comprises a helicopter body 3, propellers as required which are mounted on the helicopter body 3. For instance, there are provided four sets of propellers 4, 5, 6 and 7 on front, rear, left and right positions respectively. The propellers 4, 5, 6 and 7 are connected to a first motor 8, a second motor 9, a third motor 10, and a fourth motor 11 (to be described later) independently. Also, as described later, the driving of each of the first motor 8, the second motor 9, the third motor 10, and the fourth motor 11 are controlled independently from each other. The propellers 4, 5, 6 and 7 and the first motor 8, the second motor 9, the third motor 10, and the fourth motor 11, etc., make up together navigation means of the flying object.

On the helicopter body 3 of the helicopter 1, there is provided a control device 13. As shown in FIG. 2, the control device 13 primarily comprises a flight guiding unit 14, a flight control unit 15, a main arithmetic control unit 16, a communication unit 17, and a power supply unit 18.

The flight guiding unit 14 has a GPS device 20 as a position measuring device, an image pickup device 21, which is installed on an undersurface of the helicopter body 3, a flight guiding CPU 22 and a first storage unit 23. The image pickup device 21 is a digital camera or a video camera or the like for taking digital images and takes images under the helicopter 1.

The image pickup device 21 installed on the helicopter body 3 is not limited only to an image pickup device for acquiring images in vertically downward direction. A plurality of image pickup devices can be provided and other image pickup devices 21 may be installed at a predetermined angle with respect to vertical line in such manner that the other image pickup devices 21 acquire images, which are deviated in a direction perpendicularly with respect to an advancing direction. Information collecting device to be installed on the helicopter 1 is not limited to the image pickup devices 21, a distance measuring instrument, an infrared image pickup device, etc., can be considered.

The GPS device 20 is designed so as to determine a reference position of the helicopter 1, for instance, a mechanical center. Because values measured by the GPS device 20 represent coordinates (position) of a geocentric coordinate system (absolute coordinates system), and the GPS device 20 determines the coordinates of the reference position on the geocentric coordinate system. Also, the image pickup device 21 has an optical axis 19, which passes through the reference position, and the optical axis 19 coincides with the vertical line when the helicopter 1 is at horizontal position. Therefore, the image pickup device 21 can acquire images within a field angle θ as required directly under the helicopter 1. Further, it is designed that the center of the image coincides with the reference position.

The images acquired by the image pickup device 21 and positions and time, at which images have been acquired, are stored in the first storage unit 23, and the images, the positions and the time are associated. Further, flight planning data or the like to be used for performing autonomous flight are stored in the first storage unit 23. The images and the position, the time of the acquisition of the images may be stored in a third storage unit 31 as to be described later. In the first storage unit 23, a pattern for recognition is stored, which is used to recognize a pattern of a target mark 43 as to be described later. The pattern for recognition may be stored in the third storage unit 31 as to be described later.

In the first storage unit 23, various types of programs are stored. These programs include, for instance: an image processing program for image processing to extract the target mark 43 (to be described later) from images acquired at the image pickup device 21, or the like, a pattern recognition program for recognizing the target mark 43 by comparing the extracted target mark 43 with the pattern for recognition, a flight guiding program for preparing flight guiding data from the flight planning data and from position information as measured by the GPS device 20, an image pickup control program for controlling pickup of images by the image pickup device 21, and other programs.

The flight control unit 15 comprises the first motor 8, the second motor 9, the third motor 10, and the fourth motor 11, and a motor controller 25 for driving and controlling these motors individually, and a flight control CPU 26 for controlling the motor controller 25, a second storage unit 27, and a gyro unit 28, which issues a posture status signal by detecting posture status of the helicopter 1 with respect to the horizontal position.

In the second storage unit 27, the following programs are stored: a flight control program for calculating flight conditions such as flying speed, ascending speed, descending speed, flying direction, flying altitude, etc., based on the flight guiding data from the flight guiding unit 14, a posture control program for calculating information for posture control based on the posture status signal from the gyro unit 28, and other programs. The flight control CPU 26 issues a flight control command to the motor controller 25 according to the flight control program, controls the first motor 8, the second motor 9, the third motor 10, and the fourth motor 11 via the motor controller 25, and executes the flight thus determined. Also, the flight control CPU 26 issues a posture control command to the motor controller 25 according to the posture control program, controls the first motor 8, the second motor 9, the third motor 10, and the fourth motor 11 individually via the motor controller 25, and controls the posture of the helicopter 1 in a condition as desired (e.g. in horizontal condition, i.e. a condition where the optical axis 19 of the image pickup device 21 runs in vertical direction).

The main arithmetic control unit 16 comprises a main CPU 30, a third storage unit 31, and a switching unit 32. In the third storage unit 31, the following programs are stored: a coordination program for coordinating and controlling the flight guiding unit 14 and the flight control unit 15, the image processing program for processing images acquired by the image pickup device 21, the flight control program, a communication control program, etc.

The communication unit 17 comprises a wireless communication unit 33, an information communication unit 34, etc. The wireless communication unit 33 receives a remote flight control command from a base station on the ground and sends communication on the flying condition of the helicopter 1 to the base station. Also, the information communication unit 34 gives and takes information between the base station and the helicopter 1 by using communication means such as wireless LAN or Bluetooth (registered trademark), etc. For instance, under conditions where the helicopter 1 is landed on the base station, the flight planning data are transmitted from the base station to the helicopter 1, or information such as image, position, time, etc., which have been taken during the flight, are transmitted from the helicopter 1 to the base station.

The power supply unit 18 is a rechargeable battery, which is replaceable for instance. And the power supply unit 18 supplies electric power as necessary to the flight guiding unit 14, the flight control unit 15, the main arithmetic control unit 16, and the communication unit 17 during the flight. In a case where the helicopter 1 is landed on the base station, the power supply unit 18 is replaced with a recharged power supply unit 18 and electric power is charged in the consumed power supply unit 18.

Now, by referring to FIG. 3, description will be given below on the taking-off and landing target instrument 2.

The taking-off and landing target instrument 2 comprises a target 37, a target control unit 38, a wireless communication unit 39, a GPS device 40, and a power supply unit 41.

The target 37 is disposed at a known position. A position where the target 37 is disposed is a known point whose position is already known in advance, or a position where the target 37 is disposed is measured by the GPS device 40 or by other measuring device so that the position is at a known position.

The target 37 has a horizontal and flat taking-off and landing surface 42, which is sufficiently wide so that the flying object 1 can take off and land. A target mark 43 is provided on the taking-off and landing surface 42.

The target mark 43 is arranged by providing a plurality of light emitting elements 44 (e.g. light emitting diode: LED) in an arrangement as predetermined. For instance, in the target mark 43 as shown in FIG. 3, the light emitting elements 44 are arranged in circumferential direction in form of a plurality of concentric circles at equal distance intervals. On a circumference at the outermost position, 10 light emitting elements 44 are arranged at equal angular intervals from each other. On an intermediate circumference, 6 light emitting elements 44 are arranged with equal angular intervals from each other, and one light emitting element 44 is disposed at the center of the circle.

The target control unit 38 primarily comprises a target CPU 45, a fourth storage unit 46, a matrix decoding unit 47, and an LED driving unit 48.

The wireless communication unit 39 transmits a position of the taking-off and landing target instrument 2 as measured by the GPS device 40, or the wireless communication unit 39 transmits a synchronization signal for synchronizing the light emission of the light emitting element 44 with image pickup of the image pickup device 21 of the helicopter body 3 to the flying object 1. Positional information of the flying object 1 as determined by the GPS device 20 is transmitted from the wireless communication unit 33, and is received by the wireless communication unit 39.

A plurality of patterns for turning on and off the light emitting elements 44 in predetermined patterns are encoded and stored in the fourth storage unit 46, and data for turning on and off the plurality of patterns in a predetermined sequence are inputted.

The target CPU 45 calls in a code a required timing from the fourth storage unit 46, and the code is inputted in the matrix decoding unit 47. The matrix decoding unit 47 converts the turning-on and turning-off codes of the light emitting elements 44 as inputted from the CPU 45 for target to each individual turning-on and turning-off information for each of the light emitting elements 44, and the codes are inputted to the LED driving unit 48. Based on the turning-on and turning-off information, the LED driving unit 48 turns on or turns off the predetermined light emitting elements 44 in the pattern as preset in the predetermined sequence.

By turning on and off the predetermined light emitting elements 44 in the pattern as preset in the predetermined sequence, information on the taking-off and landing target instrument 2 side can be transmitted to the flying object 1. The types of information to be transmitted are, for instance: position of the target 37 (such as coordinates of the target 37, altitude of the flying object 1), direction of the flying object 1 with respect to the target 37, address of the target 37, and others.

In a case where two or more targets 37 are installed, an address inherent to each of the targets 37 is given and the flying object 1 identifies the address of each of the targets 37. Therefore, erroneous recognition or erroneous landing of the target 37 can be prevented. By providing two or more targets 37, it is possible to carry out photographing and surveying operation in wider range.

Next, by referring to FIG. 4A to FIG. 4F, description will be given on an example of a turned-on pattern (lighting pattern) of the target mark 43.

FIG. 4A shows a case where all of the light emitting elements 44 are turned on (hereinafter, this is referred as "center pattern"). When all of the light emitting elements 44 are turned on, the flight guiding unit 14 of the flying object 1 recognizes the target mark 43 as a circle, and identifies a size of the circle. By identifying the center of the circle, a position (coordinates) of the target 37 can be judged, and altitude of the flying object 1 can be determined by identifying the size of the circle.

FIG. 4B shows a direction of the target 37 with respect to the flying object 1. The direction of the target 37 with respect to the flying object 1 can be calculated based on positional information of the flying object 1 as transmitted from the wireless communication unit 33 and based on positional information of the taking-off and landing instrument 2. Then, based on the result of calculation, an arrow mark to indicate direction is turned on (arrow mark pattern). In the figure, an arrow mark directed in leftward direction is turned on. Each of FIG. 4C to FIG. 4F shows a case where an address is displayed in decimal system (hereinafter, this is referred as "address display pattern"). For instance, FIG. 4C shows a figure of digit 1 and indicates a numerical FIG. 1. FIG. 4D shows a figure of digit 2 and indicates a numerical FIG. 4. FIG. 4E shows a figure of digit 3 and indicates a numerical FIG. 2. FIG. 4F shows a figure of digit 4 and indicates a numerical FIG. 3. Therefore, the address of the target 37 will be 1423.

The light emitting elements 44 are displayed in the order of FIG. 4A to FIG. 4F. By recognizing the patterns shown in FIG. 4A to FIG. 4F, it is possible to determine a relative position of the flying object 1 with respect to the target 37, and a direction, in which the flying operation should be performed, and also, it is possible to judge whether the target 37 recognized is an object of landing operation or not.

FIG. 5A to FIG. 5F each represents an example of a turned-on pattern of the target mark 43.

In each of FIG. 5A to FIG. 5F, addresses of the target 37 are given in binary system. As described above, FIG. 5A and FIG. 5B each represents a condition where all of the light emitting elements 44 are turned on. From the pattern shown in FIG. 5A, relative position of the flying object 1 and the target 37 can be identified. FIG. 5B shows a pattern where an arrow mark is indicated, and by the pattern shown in FIG. 5B, a direction, in which the flying object 1 is flying can be identified.

In the addresses shown in FIG. 5C to FIG. 5F, FIG. 5C shows an address bit 1, and the address bit 1 shows that all of the light emitting elements 44 are turned on. FIG. 5D shows an address bit 2. In this case, only the light emitting elements 44 on the outer circumference are turned off (a smaller circle compared with FIG. 5C), and this condition indicates a figure "0". For instance, FIG. 5E shows an address bit 3 and the address bit 1 shows that all light emitting elements are turned on. FIG. 5F shows an address bit 4 and the address bit 1 shows that all light emitting elements are turned on. Therefore, the address of the target 37 as shown in FIG. 5C to FIG. 5F is 1011 in binary system, and is 11 in decimal system.

Even when the light emitting elements 44 are displayed by the patterns as required, it is difficult to recognize the turned-on pattern (lighting pattern) from the images where the surrounding sceneries are included. Therefore, in the present embodiment, the processing as given below is performed in order to recognize the pattern where the light emitting elements 44 are turned on.

Display on the pattern as given above represents an example, and combination and sequence order can be changed as necessary. A series of patterns are repeatedly displayed and types of information such as direction, address, etc., are transmitted depending on the patterns. By incorporating turning-on and turning-off of all of the light emitting elements 44 or a repeat display of a fixed pattern etc., at the beginning of the display of the series of patterns, the time to the starting of the pattern may be clearly indicated.

Figure 6:
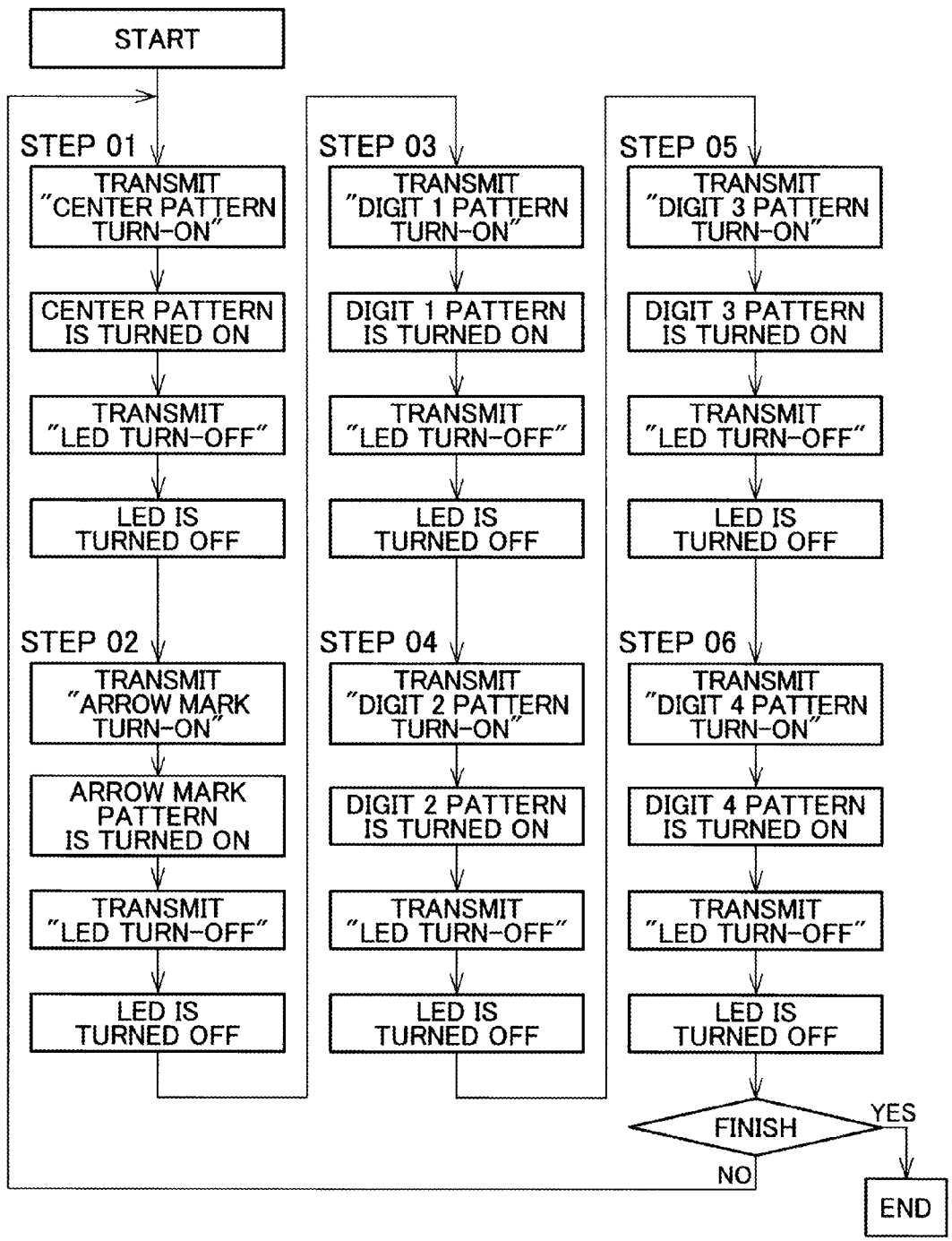
FIG. 6 is a flow chart to explain turning-on and turning-off of a target mark.

Description will be given below on turning-on and turning-off of the target mark 43 by referring to FIG. 6.

Turning-on and turning-off of the light emitting elements 44 of the target 37 are synchronized with image pickup of the target 37 by the image pickup device 21.

First, a synchronization signal to instruct that the center pattern is to be turned on by the light emitting element 44 is transmitted from the taking-off and landing target instrument 2 side to the flying object 1 via the wireless communication unit 39. In synchronization with the transmission of the synchronization signal, the center pattern is turned on. When the flying object 1 receives the synchronization signal, an image of the target 37 where the center pattern is turned on is taken by the image pickup device 21.

Next, a synchronization signal to instruct that the light emitting element 44 is to be turned off is transmitted to the flying object 1, and the light emitting elements 44 are turned off. The image pickup device 21 takes the image of the target 37 where the light emitting elements 44 are turned off.

At the flight guiding CPU 22, a signal containing only the center pattern can be extracted by removing image signals where the light emitting elements 44 are turned off from image signals where the center pattern is turned on (Step 01).

Similarly, the taking-off and landing target instrument 2 transmits synchronization signals before each pattern is turned on and turned off to the flying object 1. The flying object 1 takes images of a condition where each pattern is turned on and a condition where each pattern is turned off, and by removing image signal of the turn-off condition from the image signals of the turn-on condition, the signal containing only each pattern is extracted. Then, based on the signal thus extracted, position of each target 37, direction with respect to the target 37, and address of the target 37 are identified (Step 02 to Step 06).

Next, description will be given on operation according to the present embodiment.

First, description will be given on autonomous flight. The main CPU 30 operates the switching unit 32 and sets up the switching unit 32 so that flight guiding data from the flight guiding unit 14 are inputted to the flight control unit 15.

With the helicopter in landed condition, the flight planning data are transmitted to the control device 13 via the information communication unit 34, and the flight planning data are inputted to the first storage unit 23 via the main CPU 30. Also, position (absolute coordinates) of the taking-off and landing target instrument 2 are inputted. When all of the flight planning data are completely transmitted, autonomous flight is started based on the flight planning data.

In a case where two or more taking-off and landing target instruments 2 are provided, an address inherent to each of the taking-off and landing target instruments 2 is given, and sequence of taking-off and landing operation is determined for each of the taking-off and landing instruments 2. The taking-off and landing operation of each of the taking-off and landing target instruments 2 can be executed by setting the address of each of the taking-off and landing target instruments 2. It may be so arranged that the power supply unit 18 is replaced each time when each of the taking-off and landing target instruments 2 is landed.

Based on the inputted flight planning data, the flight guiding unit 14 prepares flight guiding data and inputs the flight guiding data to the flight control unit 15 via the switching unit 32. Then, based on the flight guiding data thus inputted, the flight control CPU 26 starts the flight by driving and controlling the first motor 8, the second motor 9, the third motor 10, and the fourth motor 11 via the motor controller 25. During the flight, positional information of the helicopter 1 is obtained from the GPS device 20. Then, based on the flight planning data and the positional information, the flight guiding CPU 22 corrects the flight guiding data as adequate and inputs the data to the flight control unit 15.

During the flight, the flight control CPU 26 controls the posture of the helicopter 1 by adequately driving and controlling the first motor 8, the second motor 9, the third motor 10, and the fourth motor 11 via the motor controller 25 based on the posture status signal from the gyro unit 28.

Also, during the flight, the flight guiding unit 14 executes operation as planned such as photographing, surveying etc., as necessary by controlling the image pickup device 21 based on the flight planning data.

When the planned operation has been completed, a return command is issued from the flight guiding unit 14. The helicopter 1 returns to the base station and is landed on the target 37.

Figure 7:
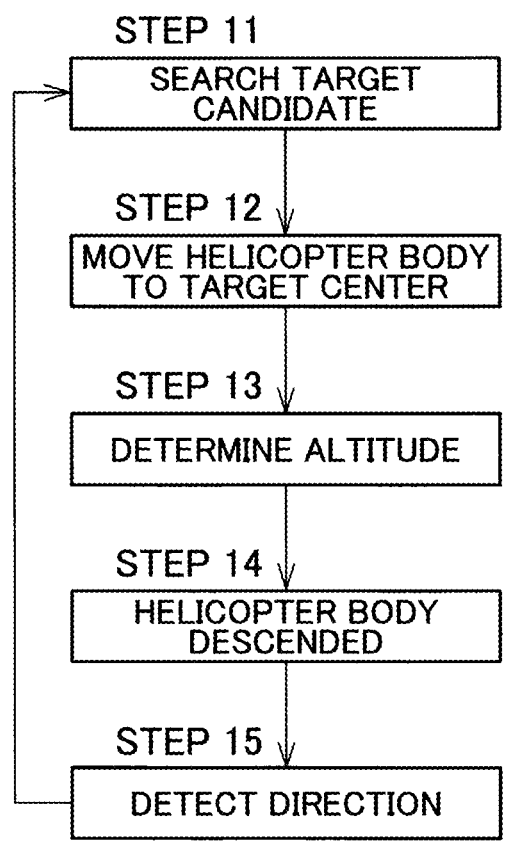
FIG. 7 is a flow chart to show operations at the time of landing in the present embodiment.

Now, referring to FIG. 7, description will be given on the landing operation.

Based on the positional information acquired by the GPS device 20 and on the coordinates of the target 37 inputted in advance, the position of the helicopter 1 with respect to the target 37 can be identified. Based on the position of the helicopter 1, the flight guiding unit 14 corrects the flight guiding data so as to guide the helicopter 1 to the base station and transmits the flight guiding data to the flight control unit 15 via the switching unit 32.

When the helicopter 1 arrives at a position in the sky above the target 37, it is searched by image processing as to whether the target 37 is included in the images taken by the image pickup device 21 or not (Step 11). Therefore, the relation between the accuracy of the measurement in the horizontal direction of the GPS device 20 and the field angle θ of the image pickup device 21 is the relation in such manner that at a position obtained based on the measurement result of the GPS device 20 and at a predetermined altitude (at an altitude where the landing operation is to be started), the image pickup device 21 can capture the target 37 (i.e. the target 37 is within a range of the field angle θ).

The recognizing of the target 37 means the recognizing of the target mark 43 concretely. The recognizing of the target mark 43 is carried out by pattern recognition based on comparison with the pattern of the target mark 43 stored in the first storage unit 23. When the target mark 43 is recognized, the guiding operation of the helicopter 1 is executed based on the recognition of the target mark 43.

Positional information of the helicopter 1 is transmitted by the wireless communication unit 33 and is received by the wireless communication unit 39. Based on the positional information of the helicopter 1, when the helicopter 1 comes in a range where the image pickup device 21 can capture the target 37, the taking-off and landing target instrument 2 starts to turn on the target mark 43. The pattern is displayed in the sequence shown in FIG. 5A to FIG. 5F.

Then, a deviation of the positions of the image of FIG. 5A and the center of the image (recognized by the pattern recognition) from the center of the image of the image pickup device 21 (a center of an image pickup element) is obtained. This deviation is reflected on the flight guidance data, and the helicopter 1 is guided in such manner that the center of the target mark 43 as recognized coincides with the center of the image.

When the center of the target mark 43 coincides with the center of the image, altitude is determined from the size of the image of the target mark 43. A diameter of a circle which is formed by all turning-on of the light emitting elements 44 is a known value, and a size of the circle (for instance, a diameter) on an image pickup element of the image pickup device 21 is detected.

Actual dimension of the target mark 43 is already known and is stored in the first storage unit 23 in advance. Thus, by comparison with the dimension stored, a distance from ground surface to the helicopter 1, i.e. an altitude, is determined. Further, in a case where the diameters (perpendicularly crossing each other) of the target mark 43 are not equal to each other, the circle is recognized as an ellipse. By a ratio of major axis to minor axis, deviation of angle and direction of deviation of the flying object 1 with respect to the vertical line, which passes the reference position of the target mark 43, can be determined, and the position of the helicopter 1 can be corrected according to the deviation of angle and to the direction of deviation thus determined.

The direction to be corrected is indicated by the pattern of FIG. 5B.

Turning-on operations of the light emitting elements 44 of the target 37 are carried out sequentially according to FIG. 5B and FIG. 5C to FIG. 5F. Based on FIG. 5C to FIG. 5F, the helicopter 1 detects the address of the target 37. If the address thus detected is correct, descending operation is continued. In a case where the address of the target 37 is different, descending operation is stopped, and the target 37 with a correct address is searched.

During a process that the address of the target 37 is corrected and descending operation is continued, it may be so arranged that the center of the target mark 43 is continuously detected and position of the helicopter 1 is corrected according to the deviation from the image center (Step 12 and Step 13).

Further, when altitude of the helicopter 1 is identified, the altitude thus determined is reflected to the flight guiding data. Under the condition that the center of the target mark 43 concurs with the center of the image, the helicopter 1 is descended.

By continuously measuring the altitude and through differentiation by time, descending speed can be determined. Then, it is judged whether the descending speed coincides with the flight planning data or not. The flight guidance data based on this judgment are sent to the flight control unit 15. Based on the flight guidance data, the flight control CPU 26 drives and controls the first motor 8, the second motor 9, the third motor 10, and the fourth motor 11 via the motor controller 25, and the descending speed is controlled (Step 14 and Step 15).

During the descending operation, the target mark 43 is continuously recognized by image processing. By detecting a deviation of the center of the target mark 43 from the optical axis 19 of the image pickup device 21 (i.e. a deviation from the center of the image), the helicopter 1 can be accurately landed at the center of the target mark 43.

As a result, in a case where two or more taking-off and landing target instruments 2 are installed, without mistaking the target for taking-off and landing, the helicopter can be landed on the target 37 with high accuracy in the autonomous flight. The image pickup device 21 for acquiring the image to detect the target mark 43 can be commonly used as a device, by which aerial photograph is taken by the helicopter 1. Because final positioning is carried out by image processing of the taken target mark 43, the GPS device 20 provided on board the helicopter 1 need not be with high accuracy, and it may be a device less costly with measurement accuracy of about 10 meters, for instance.

Therefore, no specific device is needed for operating the automatic taking-off and landing system in the present embodiment, and the landing guidance with high accuracy can be accomplished by simple configuration and at lower cost.

In the embodiment as described above, if the burden on the flight guiding CPU 22 is heavy such as the case of image processing in the flight guiding unit 14, etc., the burden of the processing may be shared by the main CPU 30, or the storage of the data and the program may be shared by the first storage unit 23 and the third storage unit 31.

In the description as given above, it may be so arranged that the coordinates of the target 37 is inputted as a part of the flight planning data, while it may be arranged so that the GPS device and the communication device are provided on the base station side, that the position of the target mark 43 is measured by the GPS device on the base station side, and also, and that positional information of the target mark 43 is transmitted from the communication device to the communication unit 17 on the helicopter 1 side. The GPS device on the base station side may not necessarily be used to measure the position of the target mark 43, but it would suffice if the position (absolute coordinates) to be measured by the GPS device on the base station side may be in a known relation with the position of the target 37. With regard to the position of the target 37 as acquired based on the measurement value of the GPS device on the base station side, when the target mark 43 is fixed, there is no change in the position of the target mark 43, and the position of the target mark 43 may be inputted to the control device 13 as the flight planning data. In this case, the communication device on the base station side may be omitted.

When the helicopter 1 takes off, an operation procedure reverse to the operation procedure of the landing as described above is carried out. That is, under the condition that the image pickup device 21 can take the image of the target mark 43, the target mark 43 is recognized from the acquired image, and ascending speed and altitude are calculated and then, the ascending operation can be controlled. In a case where the helicopter 1 reaches a predetermined altitude, autonomous flight is executed based on the flight planning data, and also based on positional information acquired at the GPS device 20.

Next, description will be given on the flight of the helicopter 1 by remote control operation.

The switching unit 32 is operated via the main CPU 30, and the main arithmetic control unit 16 is connected with the flight control unit 15 so that the flight guiding data can be sent to the flight control unit 15 from the main arithmetic control unit 16.

A remote control signal is transmitted from the remote controller 12 on the base station side, and the remote control signal is received via the wireless communication unit 33. The main CPU 30 starts the flight control program, prepares the flight guiding data based on the remote operation signal, and inputs the flight guiding data to the flight control unit 15 via the switching unit 32.

The flight control CPU 26 controls the flight via the motor controller 25 based on the flight guiding data, and controls posture of the helicopter body 3 based on a posture status signal from the gyro unit 28.

In landing the helicopter 1, similarly to the case of autonomous flight, the image pickup device 21 takes the image of the target 37 and from the image of the target 37, the target mark 43 is extracted. A center of the target mark 43 (in a state of all turning-on of the image pickup elements 44), positioning is carried out between the target mark 43 and the helicopter body 3. The image of the target mark 43 as taken by the image pickup device 21 is displayed on a display unit (not shown) of the remote controller 12, and the landing operation may be carried out by manual remote-control operation according to the image.

Figure 8:
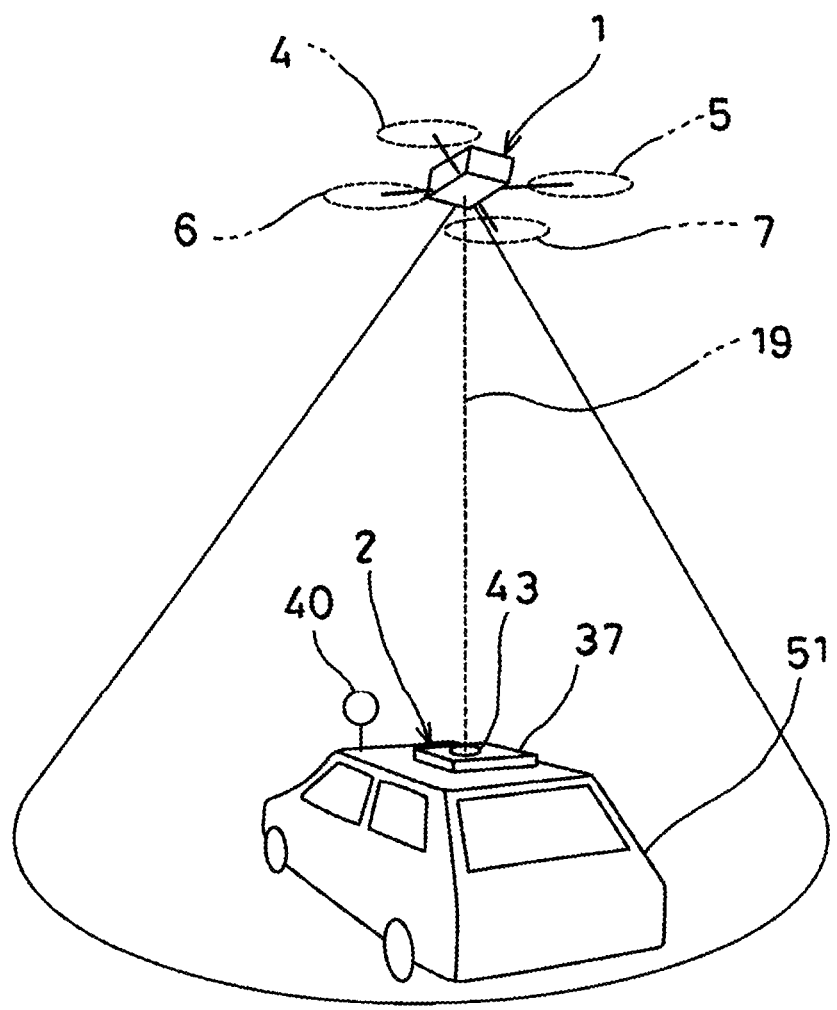
FIG. 8 is an explanatory drawing to show an application example of the present embodiment.

FIG. 8 shows an application example of the embodiment.

In this application example, the target 37 is installed on a mobile object, e.g. on ceiling of an automobile 51, and a tracking system using the automatic taking-off and landing system is configured.

If the flight planing data is so designed that the helicopter 1 is positioned at all times directly above the target mark 43, the flight guiding unit 14 recognizes the target mark 43, and the flight guiding unit 14 calculates a deviation of the center of the target mark 43 from the optical axis 19 of the image pickup device 21 (i.e. the center of the image). Then, the flight guiding data is prepared so that the center of the target mark 43 coincides with the optical axis 19 of the image pickup device 21, and the data are transmitted to the flight control unit 15. The flight control unit 15 controls the helicopter body 3 so that the helicopter body 3 is directly above the target mark 43 based on the flight guiding data, i.e. based on recognition of the position of the target mark 43 on the image.

When the automobile 51 is moved, the helicopter 1 is also moved to follow the movement of the target mark 43. Therefore, if the automobile 51 is moved along a route where information is required, information such as image data within the range where the automobile 51 etc., is moved can be acquired.

Another type of tracking system can be conceived. That is, by the GPS device 40 installed on the taking-off and landing target instrument 2, the position of the target 37, that is, the position of the automobile 51 is measured at real time, and the result of the measurement by the GPS device 40 is transmitted to the control device 13. It may be so arranged that based on the result of the measurement by the GPS device 20 of the helicopter 1 and on the result of the measurement by the GPS device 40, the control device 13 obtains deviation of positions, and the control device 13 makes the helicopter 1 trace after the automobile 51 so that the deviation will be 0.

Figure 9:
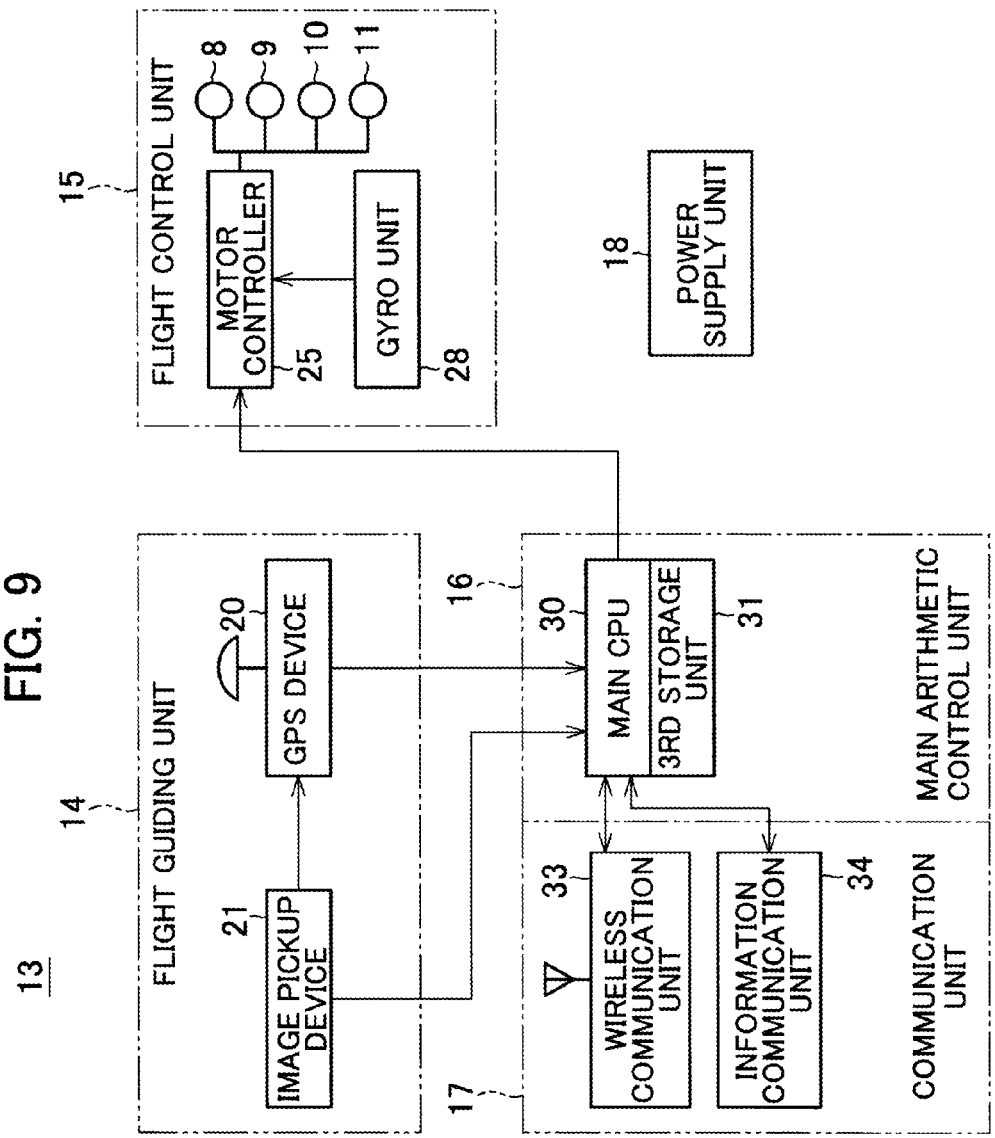
FIG. 9 is a schematical block diagram to show another embodiment of the present invention.

FIG. 9 shows another embodiment. In FIG. 9, the same component as shown in FIG. 2 is referred by the same symbol, and detailed description is not given here.

In this another embodiment, the flight guiding CPU 22 and the flight control CPU 26 of the above embodiment are put together in the main CPU 30, and a first storage unit 23 and a second storage unit 27 are put together in a third storage unit 31.

In this another embodiment, the CPUs and the storage units are put together. As a result, it is possible to provide an automatic taking-off and landing system with simple configuration and in more convenient arrangement.

In the embodiment as given above, the target mark 43 is designed in circular shape, while the target mark 43 may be in rectangular shape or triangular shape, in any shape where the center can be easily obtained. Also, the display of address is not limited to decimal system or binary system, but shapes of various types of marks themselves, which can be formed by the target mark 43, may be allotted as the address. For instance, an address 1 may be given in triangular shape, an address 2 is given in semi-circular shape, and an address 3 may be given in star-like shape.

It is needless to say that the present embodiment can be applied for operations to collect information by using a small flying object such as investigation of agricultural products, soil quantity control, construction work control, topographical investigation, investigations on buildings and constructions, investigations on electric power transmission towers, dams, and bridges, investigation on conditions of dangerous areas, monitoring and surveillance, etc.

The invention claimed is:

1. A taking-off and landing target instrument to be used in an automatic taking-off and landing system, comprising a target having a taking-off and landing surface, providing light emitting elements for displaying patterns and a target control unit for selectively controlling light emission of each of said light emitting elements, wherein said light emitting elements are provided on said taking-off and landing surface in a two dimensional arrangement, wherein a target mark having the center of pattern under all turned-on status is formed by turning on all of said light emitting elements and different predetermined two dimensional patterns may be formed by turning on different subsets of said light emitting elements, and wherein said target control unit controls a light emission so as to display firstly said all turned-on pattern by turning on all of said light emitting elements, and next, so as to display a predetermined two dimensional pattern by turning on a subset of said light emitting elements, wherein said patterns are formed by light emitted by said light emitting elements.

2. A taking-off and landing target instrument according to claim 1, wherein said predetermined two dimensional pattern includes a pattern to indicate address of said taking-off and landing target instrument.

3. A taking-off and landing target instrument according to claim 1 or claim 2, wherein said predetermined two dimensional pattern includes a pattern to indicate direction with respect to said taking-off and landing target instrument.

4. An automatic taking-off and landing system, comprising a flying object and a taking-off and landing target instrument, wherein said taking-off and landing target instrument comprises a target having light emitting elements for displaying patterns, and a target control unit for selectively controlling light emission of each of said light emitting elements, wherein said light emitting elements are provided on said taking-off and landing surface in a two dimensional arrangement, wherein a target mark having the center of pattern under all turned-on status is formed by turning on all of said light emitting elements and different predetermined two dimensional patterns may be formed by turning on different subsets of said light emitting elements, and wherein said target control unit controls a light emission so as to display firstly said all turned-on pattern by turning on all of said light emitting elements, and next, so as to display a two dimensional predetermined pattern by turning on a subset of said light emitting elements, wherein said patterns are formed by light emitted by said light emitting elements, and wherein said flying object comprises an image pickup device for taking an image in downward direction, a navigation means, and a flying object control unit for processing images acquired by said image pickup device and for controlling said navigation means, and said flying object control unit calculates positional relation of said target mark and said flying object based on image of said target mark as acquired by said image pickup device, and controls taking-off and landing operation of said flying object based on the result of calculation.

5. An automatic taking-off and landing system according to claim 4, wherein said predetermined two dimensional pattern includes a pattern to indicate address of said taking-off and landing target instrument, said flying object control unit calculates a position of the center of said target according to all turned-on pattern, calculates horizontal distance between said target and said flying object, calculates altitude of said flying object based on size of all turned-on pattern on said image, and judges whether said taking-off and landing target instrument is an object for landing based on the pattern indicated by said address or not.

6. An automatic taking-off and landing system according to claim 4, wherein said predetermined two dimensional pattern includes a pattern to indicate direction with respect to said target, and said flying object control unit judges moving direction of said flying object according to the two dimensional pattern to indicate said direction.

7. An automatic taking-off and landing system according to claim 5, wherein said predetermined two dimensional pattern includes a pattern to indicate direction with respect to said target, and said flying object control unit judges moving direction of said flying object according to said two dimensional pattern to indicate said direction.

8. An automatic taking-off and landing system according to one of claim 4-6 or 7, wherein said taking-off and landing target instruments are installed at two or more points, an inherent address is given to each of said taking-off and landing target instruments, a flight planning data are set up at said flying object control unit, said flying object control unit repeats taking-off and landing operations sequentially to two or more taking-off and landing target instruments based on said flight planning data, and makes said flying object fly autonomously while a power supply unit of said flying object is replaced by said taking-off and landing target instrument.

9. An automatic taking-off and landing system according to one of claim 4-6 or 7, wherein said flying object has a flight communication unit, said taking-off and landing target instrument has a target communication unit, wherein said target communication unit transmits a synchronization signal for turning on and turning off when said light emitting elements are turned on or turned off, said flying object control unit acquires images of said target at the time of turning on and turning off by said image pickup device based on the synchronization signal received by said flying object communication unit, and extracts a pattern image of each pattern based on image data of said target at the time of turning on and turning off.

\* \* \* \* \*